3,055,901
PREPARATION OF AMINOETHYLPIPERAZINE

George P. Speranza and Myrl Lichtenwalter, Austin, Tex., assignors to Jefferson Chemical Company, Houston, Tex., a corporation of Delaware
No Drawing. Filed May 18, 1961, Ser. No. 110,893
4 Claims. (Cl. 260—268)

This invention relates to a method for the preparation of an amine, namely, 1-(2-aminoethyl)piperazine. More particularly, this invention relates to a method for the preparation of aminoethylpiperazine from triethylenetetramine.

Aminoethylpiperazine is a useful curing agent for epoxy resins and may also be used as a chemical intermediate (e.g., for the preparation of triethylenediamine). Although a minor amount of aminoethylpiperazine is formed as a by-product in the synthesis of piperazine from ethanolamine, or ethylenediamine, there has heretofore been no known method for producing this material as a primary product when the feed stock is an ethylene polyamine.

This is not surprising when it is considered that the knowledge of the art with respect to the conversion of aliphatic polyamines is largely empirical. For example, deamination reactions are notorious for their poor selectivity due to the many possible side reactions than can occur. This is particularly true when it is attempted to form a heterocyclic compound such as piperazine from an ethylene polyamine. Thus, ring closure can be effected with ethylene polyamines in the presence of hydrogenation catalysts only under comparatively severe operating conditions. While severe operating conditions do promote cyclization, they also promote a wide variety of cracking and condensation reactions whereby a wide variety of products are normally formed. Moreover, since the reaction mechanisms are not fully understood, the synthesis of piperazine type compounds has remained largely an empirical art.

The fact that cracking reactions tend to predominate when ethylene polyamines are treated under conditions severe enough to promote ring closure is shown, for example, by Kyrides U.S. Patent No. 2,267,668, wherein it is suggested that ethylenediamine, diethylaminetriamine, triethylenetetramine or tetraethylenepentamine are all suitable feed stocks for the preparation of piperazine (apparently due to the susceptibility of the higher polyethylene polyamines to cracking).

As a consequence, when it is desired to prepare aminoethylpiperazine in significant yields, it has been considered desirable to utilize raw feed materials other than polyethylene polyamines.

Kermack and Smith (J. Chem. Soc., 1931, 3096) reported the preparation of aminoethylpiperazine by a route illustrated by the reactions below:

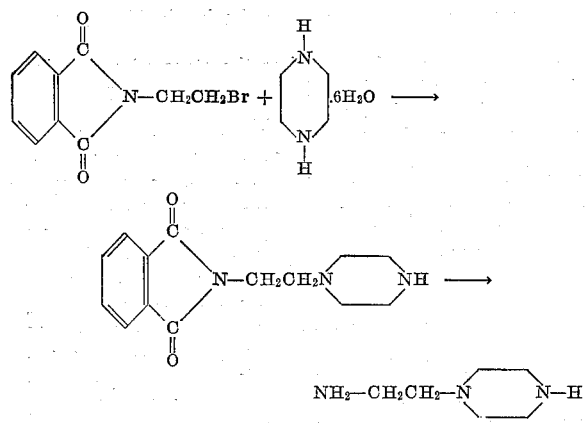

Another preparation by van Alphin (Rec. Trav. Chem., 56, 1007, 1937) has been described:

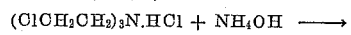

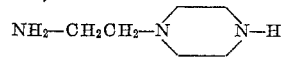

These approaches leave much to be desired.

In contrast to the foregoing, it has now been discovered that aminoethylpiperazine can be prepared in surprisingly high yields and as a principal product of the reaction when triethylenetetramine is treated under controlled reaction conditions that have been discovered to favor cyclization without promoting undue cracking.

Briefly, in accordance with the present invention, triethylenetetramine is brought into contact with a hydrogenation catalyst, as hereinafter defined, at a temperature within the range of about 150° to about 300° C. (and more preferably within the range of about 170° to 250° C.), and a pressure within the range of about 1500 to about 5000 p.s.i.g. (and more preferably within the range of about 1800 to about 3000 p.s.i.g.), and in the presence or absence of, but preferably in the presence of, one or more of water, hydrogen and ammonia to provide a reaction product containing aminoethylpiperazine as a major component of the reaction and by recovering aminoethylpiperazine from the product of the reaction by any suitable means, such as distillation.

For best results, the reaction is conducted in the presence of added hydrogen which may suitably be added in an amount such that the reaction is conducted in the presence of from about 10 to about 200 atmospheres of hydrogen and, more preferably, from about 10 to about 100 atmospheres of hydrogen. It is desirable to employ added ammonia and when ammonia is employed, it is preferable to employ from about 1 to about 10 mols of ammonia per mol of triethylenetetramine. In general, it is more preferable to utilize a molar excess of ammonia such as a molar ratio of from about 2 to about 4 mols of ammonia per mol of triethylenetetramine.

When added water is to be employed, it will preferably be employed in an amount within the range of about 5 to 100 wt. percent, based on the total weight of the non-aqueous charge materials.

The catalysts to be used in accordance with the present invention are catalysts consisting essentially of from about 60 to about 100 wt. percent of a member selected from the group consisting of cobalt, nickel and mixtures thereof and from about 0 to about 40 wt. percent of a promoter selected from the group consisting of copper, copper oxide, chromium oxide, manganese oxide, molybdenum oxide, thorium oxide and mixtures thereof. It is within the scope of the present invention to utilize unsupported catalysts of the above description or to employ a catalyst of the above description which is supported on an inert support such as gamma alumina, kieselguhr, etc.

A preferred group of catalysts from the class described includes Raney nickel, Raney cobalt and a catalyst consisting of a mixture of about 60 to 80 wt. percent nickel, 30 to 15 wt. percent copper and about 1 to 10 wt. percent chromium oxide.

For best results it is desirable to utilize a contact time within the range of about 0.5 to about 2 hours and, more preferably, a contact time of about 0.8 to about 1.5 hours. A significant decrease in the yield of aminoethylpiperazine is encountered either above or below this range.

The invention will be further illustrated by the following specific examples which are given by way of illustration and not as limitations on the scope of this invention. Where parts are mentioned, they are parts by weight.

Example I

To a 1400 ml. rocking autoclave was added 100 g. of triethylenetetramine, 100 g. of water and 50 g. of a catalyst prepared from a mixture of 75 wt. percent nickel, 22 wt. percent copper and 3 wt. percent chromium oxide. The autoclave was assembled, the contents flushed with hydrogen and then 100 g. of ammonia added. Hydrogen was then added so that at 30° C. a total pressure of 500 p.s.i.g. was obtained. Heat was applied and in 80 minutes a temperature of 209° C. was obtained and a pressure of 1900 p.s.i.g. developed. The temperature was maintained at 200° to 209° C. for one hour. During this period the pressure stayed between 1775 p.s.i.g. and 1900 p.s.i.g.

After filtering the product to remove the catalyst and dissolved ammonia, the following yields were obtained based on triethylenetetramine charged.

| Product: | Yield, percent |
|---|---|
| Aminoethylpiperazine | 41.6 |
| Piperazine | 21.8 |
| Ethylenediamine | 5.2 |
| Diethylenetriamine | 2.2 |

Example II

To a 1400 ml. rocking autoclave was added 100 g. of tetraethylenepentamine, 100 g. of water and 50 g. of a nickel-copper-chromia catalyst. The autoclave was assembled, purged with hydrogen and then 100 g. of ammonia added. Hydrogen was added to give a pressure of 500 p.s.i.g. at 37° C. After one hour at 225° C. and 2100 p.s.i.g. total pressure the product was filtered and the products, in the yields quoted, were obtained.

| Product: | Yield, percent |
|---|---|
| Aminoethylpiperazine | 17.0 |
| Piperazine | 15.2 (assumes one mol of piperazine from one mol TEP). |
| Ethylenediamine | 2.4. |

Example III

To a 1400 ml. rocking autoclave was added 105 g. of triethylenetetramine and 10 g. of Raney cobalt catalyst. The autoclave was assembled, flushed twice with hydrogen and hydrogen added until a pressure of 500 p.s.i.g. was reached. After one hour at 200° C. and 2400 p.s.i.g. the product was filtered. 100 ml. of water was added to the autoclave to further wash out the bomb and remove the product from the catalyst. The total weight of the product including the washings was 180 g. This product was carefully analyzed and the following compounds identified in the yields stated.

| Product | Yield, percent | Wt. percent |
|---|---|---|
| Water | | 52.6 |
| Ethylenediamine | 2.8 | 2.0 |
| Monoethanolamine | | 0.9 |
| Methylpiperazine | 1.0 | 0.8 |
| Ethylpiperazine | 0.9 | 0.4 |
| Aminoethylpiperazine | 53.0 | 27.3 |
| Piperazine | 23.0 | 7.9 |

Example IV

To the 1400 ml. rocking autoclave was added 100 g. of triethylenetetramine, 100 g. of water and 50 g. of Raney nickel. The contents were flushed with hydrogen and hydrogen added to 500 p.s.i.g. After one hour at 225° C. and 2000 p.s.i.g. total pressure the product was filtered and freed of catalyst.

| Product: | Yield, percent |
|---|---|
| Ethylene diamine | 2.0 |
| Piperazine | 21.2 |
| Aminoethylpiperazine | 26.0 |

Example V

To a 1400 ml. rocking autoclave was added 100 g. of triethylenetetramine, 100 g. of water and 50 g. of a nickel-copper-chromia catalyst. The autoclave was assembled and 100 g. of ammonia added. After one hour at 218° to 223° C. and 1450 to 1625 p.s.i.g., the contents wer filtered.

| Product: | Yield, percent |
|---|---|
| Ethylenediamine | 1.0 |
| Piperazine | 28.0 |
| Aminoethylpiperazine | 21.3 |
| Hydroxyethylpiperazine | 2.8 |

Example VI

To a 1400 ml. rocking autoclave was added 100 g. of diethylenetriamine, 100 g. of water and 50 g. of a nickel-copper-chromia catalyst. The autoclave was assembled, flushed with hydrogen and 100 g. of ammonia added. Hydrogen was added to give a total pressure at 23° C. of 500 p.s.i.g. The contents were heated to 220° C. and held at 220° C. and 1900 p.s.i.g. for one hour. After filtering the product to remove the catalyst, it weighed 157 g.

| Product: | Yield, percent |
|---|---|
| Ethylenediamine | 5.3 (assumes two mols theoretical). |
| Piperazine | 39.0. |
| Aminoethylpiperazine | 21.1. |
| Methylpiperazine | 2.5. |
| Ethylpiperazine | 1.6. |

What is claimed is:

1. A method which comprises the steps of contacting triethylenetetramine or mixtures rich in triethylenetetramine with from about 1 to 10 mols of ammonia per mol of triethylenetetramine for a period of time within the range of 0.5 to 2 hours with a hydrogenation catalyst under reaction conditions including a temperature within the range of about 150° to about 300° C. and a pressure within the range of about 1500 to about 5000 p.s.i.g. to form a reaction mixture containing aminoethylpiperazine as the principal product of the reaction and recovering said aminoethylpiperazine from said reaction product, said hydrogenation catalyst consisting essentially of from about 60 to about 100 wt. percent of a member selected from the group consisting of cobalt, nickel and mixtures thereof, and from about 0 to about 40 wt. percent of a promoter selected from the group consisting of copper, copper oxide, chromium oxide, manganese oxide, molybdenum oxide, thorium oxide and mixtures thereof.

2. A method which comprises the steps of contacting triethylenetetramine with a hydrogenation catalyst for a period of time within the range of about 0.8 to 1.5 hours in the presence of about 2 to 4 mols of ammonia per mol of triethylenetetramine under reaction conditions including a temperature within the range of about 170° to about 250° C. and a pressure within the range of about 1800 to about 3000 p.s.i.g. and a hydrogen partial pressure within the range of about 10 to about 100 atmospheres, to form a reaction mixture containing aminoethylpiperazine as a principal product of the reaction and recovering said aminoethylpiperazine from said reaction product, said hydrogenation catalyst consisting essentially of from about 60 to about 100 wt. percent of a member selected from the group consisting of cobalt, nickel, and mixtures thereof, and from about 0 to about 40 wt. percent of a promoter selected from the group consisting of copper, copper oxide, chromium oxide, manganese oxide, molybdenum oxide, thorium oxide, and mixtures thereof.

3. A method as in claim 2 wherein the hydrogenation catalyst is Raney cobalt.

4. A method as in claim 2 wherein the catalyst consists of a mixture of 60 to 80 wt. percent nickel, 30 to 15 wt. percent copper and about 1 to 10 wt. percent chromium oxide.

References Cited in the file of this patent

UNITED STATES PATENTS 2,267,686     Kyrides _____ Dec. 23, 1941

FOREIGN PATENTS 809,239     Great Britain _____ Feb. 18, 1959